AERIAL FOR VERY HIGH FREQUENCY RADIO RECEIVERS

Filed May 2, 1949

Inventors
Edward George Ormie Anderson,
Geoffrey Gordon Blundell, and
John Emyr Rhys-Jones
By: Watson, Cole, Grindle & Watson, attorneys Patented Sept. 16, 1952 2,611,082

UNITED STATES PATENT OFFICE 2,611,082

AERIAL FOR VERY HIGH FREQUENCY RADIO RECEIVERS

Edward George Orme Anderson, West Wickham, Geoffrey Gordon Blundell, Ealing, London, and John Emyr Rhys-Jones, Iver, England, assignors to Scophony-Baird Limited, London, England, and The Plessey Company Limited, Ilford, England, both British companies Application May 2, 1949, Serial No. 90,988
In Great Britain July 7, 1948

4 Claims. (Cl. 250—20)

This invention relates to antennae for very high frequency radio receivers, i. e. radio receivers operating at frequencies above thirty megacycles per second, and is particularly applicable to receivers for television and frequency-modulation transmissions which normally employ these very high frequencies.

At these frequencies, in order to obtain a good signal strength, it has been customary to use tuned antennae, for example, half-wave dipoles. For domestic receivers it is the usual practice to have a single receiving antenna and feeder system terminating at a fixed point where the receiver must be installed. It is thus impossible to move the receiver from room to room and operate it anywhere that it may be required.

It is an object of this invention to provide a receiver for very high frequency waves which is truly transportable and which can be moved about and operated where desired.

It is a further object of the invention to provide a very high frequency radio receiver which can be operated without a separate antenna.

To achieve this, use is made of the radio frequency signal voltage that exists in electric power supply mains. It will be appreciated that the electric power wiring system of any building may be regarded as a mass of metal having a large component or dimension in the plane of polarisation of the radio wave to be received. Thus if a horizontally polarised wave is to be received signal voltages would be induced in the horizontal stretches of the wiring system whereas, for a vertically polarised signal, the vertical stretches of the wiring must be considered.

It has been known to utilise electric power supply mains for receiving relatively low frequency radio signals by using the supply wiring as an untuned antenna system. At very high frequencies however, the signal strength provided by an untuned antenna is normally insufficient for the satisfactory operation of present types of television receivers and other radio receiving apparatus.

To overcome this difficulty, the signal voltage required to operate the apparatus is obtained from the electric power supply mains, according to the present invention, by the use of an impedance-matching device between the mains and the receiver to enable the signal voltage existing in said mains to be utilised.

It is thus a further feature of this invention to provide a method of applying radio frequency signals to a very high frequency receiver which consists in connecting an impedance matching device between the electric power supply mains system and the radio frequency input circuit of the receiver to utilise the signal voltage existing in said mains.

It is yet a further feature of the invention to provide a very high frequency radio receiving apparatus for operation from electric power supply mains comprising a radio frequency receiver having an input circuit and an impedance matching device connected between the electric power supply mains and the radio frequency input circuit of the receiver to utilise the signal voltage existing in said mains.

It is a still further feature of the invention to provide an impedance matching device for connecting between the radio frequency input circuit of a receiver and the electric supply mains.

The following is a description of two embodiments of the invention, reference being made to the accompanying drawings in which.

Since the length of the electric power supply wiring system is normally much greater than the wavelength of the radio frequency signals to be received, standing waves will be formed in the supply mains. Dependent on the position of the mains plug, the receiving apparatus may be attached to the mains at any outlet point and hence the radio frequency impedance at the outlet point may vary from something like 70 ohms, if the outlet point happens to be a current antinode, to something like 3000 ohms if the outlet point happens to be a voltage antinode. The impedance of the mains has to be matched to the radio frequency input impedance of the receiver.

One method of achieving the required result consists in connecting an impedance matching circuit, such as a pi matching circuit or a tapped Johnson "Q" circuit, between the power plug by which the receiver is connected to the power supply system and radio frequency input of the receiver. The leads carrying electric power from the power plug to the receiver must in this case be fitted with chokes or other means of preventing transfer of signal volts to the receiver in order to avoid short-circuiting the radio frequency input.

Another method of achieving the desired result is to make a length of the mains lead adjacent the receiver resonate at the required frequency. This is done by isolating the lead with a suitable reactive impedance, such as a high frequency choke or tuned circuit, at a point remote from the receiver and employing this length of lead as a resonant circuit which is excited from the mains and also by direct pick-up. The voltage induced in this resonant length of lead is applied to the receiver. Such an arrangement constitutes, in effect, an impedance matching device which can be attached to the supply mains at any point.

Figure 1:
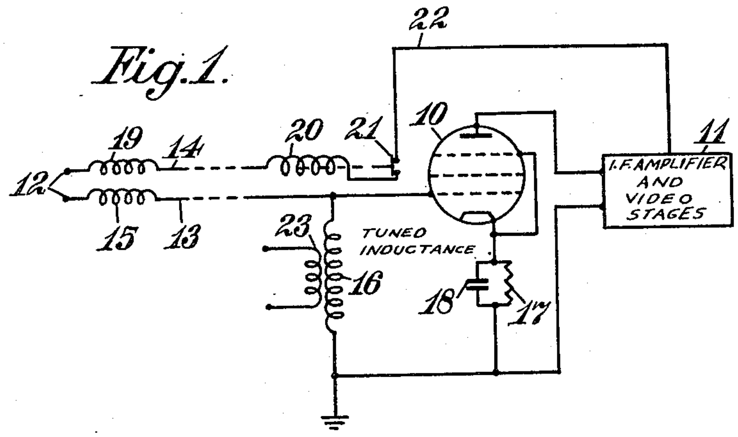
Figure 1 is a circuit diagram showing one embodiment of the invention.

It will be understood that this invention may be used with any known type of very high frequency receiver and except for the radio frequency input and connections to the power supply, the details of the receiver construction form no part of the present invention. For this reason, the receiver illustrated in Figure 1 is shown as comprising a first radio frequency input tube 10 with its associated circuits to be described hereinafter, the remainder of the receiver being indicated diagrammatically by the rectangle 11. This may, for example, comprise a television receiver and, except as hereinafter described, would be of conventional construction. Thus, the rectangle 11 may represent the I. F. amplifier and video stages of the receiver.

The receiver is connected to the mains power supply at the terminals 12 by means of a pair of conductors 13, 14. The conductor 13 is connected to the input grid of the radio frequency pentode amplifier tube 10. At a point distant from the receiver corresponding to half a wavelength at the desired reception frequency, a high frequency choke 15 or a tuned circuit is inserted in lead 13. The receiver end of the lead 13 is also connected to one end of the tuned inductance 16 which forms the input circuit of the tube 10. The impedance of this inductance 16 is chosen to suit the input impedance of the tube which for a typical radio frequency pentode would be of the order of 3000 ohms.

The cathode circuit of the tube 10 includes, in the usual manner, a cathode resistor 17 and bypass condenser 18. The suppressor grid is connected to the cathode. Filament or heater supply circuits for the cathode and the D. C. screen potential supply circuits are not shown, these being provided in the conventional manner.

The half wavelength section of the conductor 13 acts as a resonant circuit which is excited from the mains and also by direct pick-up. Normally the connector to the mains supply comprises a pair of insulated conductors and, in order to prevent loss of signal strength, it is preferable to isolate also the length of the second conductor 14 which lies adjacent to the half wavelength section of conductor 13. For this purpose a choke 19 or tuned circuit is inserted in the conductor 14 at the appropriate point remote from the receiver. A similar reactive impedance could be used at the receiver end of the conductor 14. However, as is shown in Figure 1, there may be employed a coil 20 which forms the operating coil of an overload cut-out arranged to open contacts 21 in the lead 22 by which power is taken from the operating coil 20 to the receiver 11. The coil 20 carries the total current taken from the mains and the overload cut-out is arranged to break the power supply if the receiver should draw excessive current.

The circuit illustrated in Figure 1 is particularly suitable for use with an A. C./D. C. receiver and the cathode end of inductance 16 is connected to ground. When a D. C. supply is used, it is preferably that the conductor 13 which is connected to the grid of the tube 10 should be the lower potential lead. It will be appreciated that the inductance 16 also carries the total current taken from the mains by the receiver and might be employed as the operating coil of an overload cut out instead of using the coil 20.

Although in the arrangement just described, a resonant half-wavelength section of the mains lead has been isolated, those skilled in the art will readily appreciate that other resonant lengths can be employed. A half-wavelength section such as has been described provides a high impedance point at its ends and thus may be connected directly to the grid of the tube 10. It may, however, be desirable to provide also a low impedance input to the receiver to enable it to be used with a conventional type of centre-tapped half wave receiving dipole. For this purpose, the inductance 16 is coupled to a coil 23 which has an impedance looking into the receiver of approximately 75 ohms so as to provide an input to the receiver suitable for connection to the centre tapped half wave dipole by means of a coaxial or other suitable cable of such impedance.

The chokes 15 and 19 or other reactive impedances used for terminating the isolated section of the mains connector at a point remote from the receiver may conveniently be mounted on a plug adapted to fit a standard wall socket. The receiver can thus be placed in any convenient situation near a power supply socket and the mains connector from the receiver plugged in. The signal induced in the resonant section is derived both from the remainder of the mains supply system and from direct pick-up and it has been found that this arrangement works quite satisfactorily whether the half wave length section is straight or not.

Figure 2:
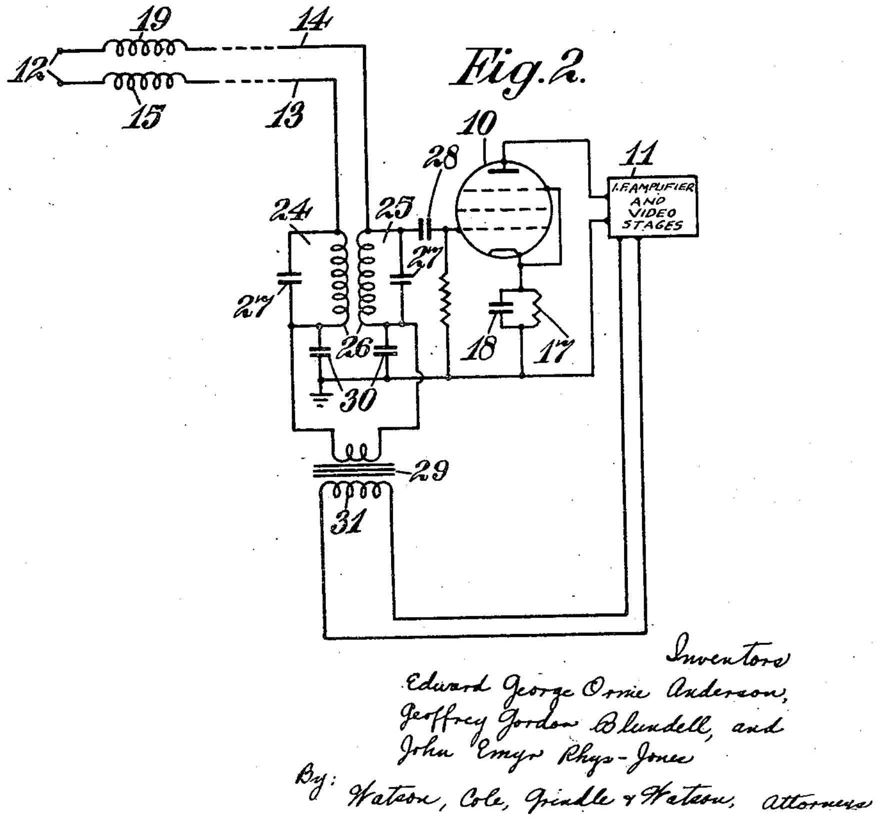
Figure 2 is a modification of the arrangement shown in Figure 1.

In Figure 2 is illustrated a modified arrangement in which the resonant sections of the two conductors 13, 14 are respectively terminated by tuned circuits 24 and 25 each comprising an inductance 26 and capacity 27. The two inductances 26 are coupled and the signal across the tuned circuit 25 is applied to the grid of the tube 10 through a condenser 28 in the usual manner.

The particular circuit shown in Figure 2 is for use with A. C. supply mains only and the supply current for the receiver is taken from the secondary of a transformer 29, the primary of which is connected to the ends of the inductances 26 remote from the leads 13 and 14. These ends of the inductances 26 are also connected to ground by the condensers 30 to form the radio frequency input circuit to the tube 10. The transformer 29 is shown with a single secondary winding 31 but it will be understood that this winding may be tapped or a number of independent windings be provided in the conventional manner to supply the various A. C. input voltages required by the receiver.

In a similar manner to the arrangement described with respect to Figure 1, the inductances 26 may be the operating coils of overload cut-outs arranged to break the power supply to the receiver should it draw an excessive current.

We claim:

1. Radio receiving apparatus for operation from electric supply mains to receive very high frequency radio signals comprising a radio frequency receiver having an input circuit, an impedance matching device having input and output circuits, means connecting the input circuit of the matching device to the power supply mains, means connecting the output circuit of the matching device to the radio frequency input of the receiver, a power supply circuit for the receiver also connected to the output circuit of the matching device for drawing electric power from the supply mains through said matching device and means for preventing radio frequency signals from passing through said power supply circuit.

2. Radio receiving apparatus for operation from electric supply mains to receive very high frequency radio signals comprising a radio frequency receiver having an input circuit, a connector to the supply mains having a pair of conductors, means for isolating adjacent sections of the two conductors which sections are of such length as to resonate at the desired reception frequency, two coupled tuned circuits, means connecting the two isolated sectors of the conductors respectively to each of the tuned circuits and means for applying the radio frequency voltage developed across one of said tuned circuits to the input circuit of the receiver.

3. Very high frequency radio receiving apparatus for operation from electric power supply mains comprising a radio frequency receiver having an input circuit, an impedance matching device connected between the electric power supply mains and the radio frequency input circuit of the receiver to utilise the signal voltage existing in said mains, a power supply circuit for drawing power for the receiver from the supply mains through said impedance matching device and a coil operated overload cut-out having its operating coil connected in said power supply circuit which operating coil has a higher impedance to radio frequency signals than to the power supply current.

4. Television receiving apparatus for operation from electric supply mains comprising a very high frequency receiver having two alternative signal input circuits, one of low impedance adapted for connection to a centre-tapped half-wave receiving antenna and the other of high impedance for connection to an end-connected half-wave receiving antenna; an impedance matching device having input and output circuits, the output circuit being of high impedance; means connecting the input circuit of the matching device to the power supply mains; means connecting the output circuit of the matching device to the high impedance input of the receiving apparatus, and a power supply circuit for the receiver also connected to the output circuit of the matching device for drawing electric power from the supply mains through said matching device.

EDWARD GEORGE ORME ANDERSON.
GEOFFREY GORDON BLUNDELL.
JOHN EMYR RHYS-JONES.

REFERENCES CITED

The following references are of record in the file of this patent:

UNITED STATES PATENTS

| Number | Name | Date |
|---|---|---|
| 2,310,896 | Gustafson | Feb. 9, 1943 |
| 2,311,472 | Roosenstein | Feb. 16, 1943 |
| 2,520,811 | Reid | Aug. 29, 1950 |
| 2,553,734 | Adler | May 22, 1951 |

FOREIGN PATENTS

| Number | Country | Date |
|---|---|---|
| 340,389 | Great Britain | Jan. 1, 1931 |